US012240141B2

(12) United States Patent
Koch

(10) Patent No.: US 12,240,141 B2
(45) Date of Patent: Mar. 4, 2025

(54) SAWING FACILITY AND METHOD FOR SAWING A SAWING MATERIAL

(71) Applicant: Gebrueder Linck Maschinenfabrik "Gatterlinck" GmbH & Co. KG, Oberkirch (DE)

(72) Inventor: Matthias Koch, Tuebingen (DE)

(73) Assignee: Gebrueder Linck Maschinenfabrik "Gatterlinck" GmbH & Co. KG, Oberkirch (DE)

( * ) Notice: Subject to any disclaimer, the term of this patent is extended or adjusted under 35 U.S.C. 154(b) by 407 days.

(21) Appl. No.: 17/881,268

(22) Filed: Aug. 4, 2022

(65) Prior Publication Data

US 2022/0371218 A1 Nov. 24, 2022

Related U.S. Application Data

(63) Continuation of application No. PCT/EP2021/050886, filed on Jan. 18, 2021.

(30) Foreign Application Priority Data

Feb. 7, 2020 (DE) ..................... 10 2020 103 192.0
Feb. 7, 2020 (DE) ..................... 20 2020 104 273.4

(51) Int. Cl.
*B27B 29/08* (2006.01)
*B27B 15/04* (2006.01)

(52) U.S. Cl.
CPC .............. *B27B 29/08* (2013.01); *B27B 15/04* (2013.01)

(58) Field of Classification Search
CPC ......... B27B 31/02; B27B 31/04; B27B 31/06; B27B 31/08; B27B 29/00; B27B 29/08;
(Continued)

(56) References Cited

U.S. PATENT DOCUMENTS 3,457,978 A 7/1969 Ahlstedt
3,503,428 A 3/1970 Ackerfeldt
(Continued)

FOREIGN PATENT DOCUMENTS

CH 320443 A 3/1957
CN 103978267 B 8/2016
(Continued)

OTHER PUBLICATIONS

International Preliminary Report on Patentability mailed Jul. 28, 2022, in corresponding International Application No. PCT/EP2021/050886.

(Continued)

*Primary Examiner* — Matthew Katcoff
(74) *Attorney, Agent, or Firm* — Harness, Dickey & Pierce, P.L.C.

(57) ABSTRACT

A sawing facility includes a rail guide, a saw arranged on the rail guide, a first carriage arranged on one side of the saw along the rail guide, and a second carriage arranged on the other side of the saw along the rail guide. The first carriage includes a first saw log support and a first carriage drive that can move the first carriage together with a first saw log on the rail guide and past the saw to saw the first saw log. The second carriage includes a second saw log support and a second carriage drive that can move the second carriage together with the second saw log on the rail guide and past the saw to saw the second saw log. The second saw log is loaded onto the second saw log support while the first saw log is sawed using the first carriage.

20 Claims, 6 Drawing Sheets

(58) Field of Classification Search
CPC ....... B27B 29/085; B27B 25/00; B27B 25/04; B27B 15/00; B27B 15/02; B27B 15/04; B27B 15/08; B27B 13/00; B27B 13/04; B27B 1/002
See application file for complete search history.

(56) References Cited

U.S. PATENT DOCUMENTS

| | | | | |
|---|---|---|---|---|
| 3,731,578 | A | 5/1973 | Ackerfeldt | |
| 4,665,786 | A | 5/1987 | Shields | |
| 5,011,001 | A * | 4/1991 | Cameron | B27B 29/08 414/753.1 |
| 5,088,363 | A | 2/1992 | Jones et al. | |
| 5,813,302 | A * | 9/1998 | Haglund | B27B 7/00 83/425.2 |
| 6,532,850 | B1 | 3/2003 | Bergvall et al. | |
| 9,573,291 | B1 * | 2/2017 | Hurdle | B27B 29/10 |
| 10,857,693 | B2 * | 12/2020 | Barber | B27B 13/04 |

FOREIGN PATENT DOCUMENTS

| | | | |
|---|---|---|---|
| EP | 0963822 | A2 | 12/1999 |
| FR | 986565 | A | 8/1951 |
| FR | 1355680 | A | 3/1964 |

OTHER PUBLICATIONS

International Search Report and Written Opinion mailed May 11, 2021, in corresponding International Application No. PCT/EP2021/050886.

* cited by examiner

SAWING FACILITY AND METHOD FOR SAWING A SAWING MATERIAL

CROSS-REFERENCE TO RELATED APPLICATIONS

This application is a continuation of International Application No. PCT/EP2021/050886 filed on Jan. 18, 2021, which claims benefit of: (1.) German Application No. 10 2020 103 192.0 filed on Feb. 7, 2020; and (2.) German Application No. 20 2020 104 273.4 filed on Feb. 7, 2020. The entire disclosures of the above applications are incorporated by reference.

FIELD

The present disclosure relates to sawing facilities and to methods for sawing a sawing material.

BACKGROUND

Sawing facilities known from the prior art are, for example, what are called block band sawing facilities, which generally have one or two band saw columns, the positioning of which in relation to each other is either fixed in a predefined manner (e.g. lying next to each other) or variable (movable relative to each other along at least one direction). In addition, known sawing facilities have a carriage that can be moved back and forth (or in and out) by means of a drive on a rail guide that defines a longitudinal direction.

By way of example, a system for cutting logs into lumber or boards is dis-closed by EP 0 963 822 A2, which system has a carriage moveable back and forth for trans-porting logs and has a band saw. Furthermore, a band sawing facility with two band saws is known from CN 103 978 267 A.

The carriage serves as a support for a saw log (for example, a tree trunk), which saw log is fixed in a predefined position on the carriage before sawing by means of several clamping hooks, for example, and transports the saw log through the band saw column during the forward or backward movement with a specific positioning relative to the saw blade of the band saw. Depending on the design of the saw blade, a sawing product (e.g. a board) is cut off from the saw log either only during the forward or the backward movement or during both movements (if the saw blade is toothed on both sides). The resulting thickness (e.g. board thickness) of the sawing product is determined by a distance between the saw log and the saw blade before sawing, which distance can be set, for example, by the support of the carriage being moved in a transverse direction.

In the case of band saws, the band saw blade is usually clamped between two band saw rollers mounted on the band saw column and runs around them at an adjustable sawing speed. The sawing direction of the band saw blade is usually perpendicular to the longitudinal direction.

The actual sawing step can be preceded and/or followed by further processing steps. For example, the log can be first measured by means of an (e.g. optical) measuring system. In addition, the so-called slab (the first piece of the log to be cut off that is not suitable for further processing) can be chipped by means of a chipping unit as an alternative to sawing off this slab. In addition, the log can be separated or trimmed in its transverse direction, for example, by means of a separating and trimming circular saw. These pre-processing operations essentially serve to straighten the log.

The exact processing sequence for a sawing facility known from the prior art is thus summarized as follows:

In a first step, the saw log is transferred at a transfer position to a support of the carriage by means of a transverse movement and rotated on this support manually (e.g. via remote control by an operator) or automatically (e.g. via a camera system) into a predetermined position. As soon as the saw log has reached the predetermined position, this position is fixed on the support with the aid of a clamping mechanism (e.g. via clamping hooks).

In the subsequent step, the saw log is displaced by means of a transverse movement of the support in relation to the band saw column in such a way that a predefined projection is created between the saw log to be cut and the saw blade, by means of which projection the desired thickness of the sawing product is defined. Alternatively or additionally, the band saw column can be moved in the transverse direction.

After the predefined alignment, fixing and relative movement of the saw log, it is moved by means of the carriage along the longitudinal direction past the saw blade and a (first) sawing product is cut off from the saw log. As soon as the sawing product has left the saw blade, the sawing product is again moved in the transverse direction relative to the saw blade by a predefined amount in order to produce a next sawing product with the desired thickness in the next sawing step.

In some cases, it is also necessary to reposition or rotate the saw log on the clamping block carriage due to a desired cutting pattern during or after processing that has already taken place, which is usually made possible by means of a so-called log turner or material turner. By means of this log turner, it is possible to rotate a sawing material lying on the carriage about its longitudinal axis into a desired position.

Once the processing of a saw log is completed, the carriage returns to its loading position and the previously described process starts again.

Both the loading of the carriage and the turning or positioning of the saw log on the carriage support require time during which no material can be processed. Consequently, production and performance losses of the sawing facility occur during this loading or positioning time, which has economically disadvantageous consequences. The time lost can amount to 10 seconds or more per log.

SUMMARY

In view of the aforementioned situation, it is an object of the present disclosure to provide an improved sawing facility allowing for higher productivity.

It is another object to provide an improved sawing facility allowing for highly cost efficient sawing of logs.

It is yet another object to provide an improved sawing facility allowing for time efficient sawing of logs.

According to a first aspect, there is provided a sawing facility comprising: a rail guide having a first end and a second end, the rail guide defining a longitudinal direction from the first end to the second end; a saw arranged at a central area of the rail guide between the first end and the second end; a first saw log feeder arranged on a first side of the saw along the longitudinal direction; a second saw log feeder arranged on a second side of the saw opposite from the first side along the longitudinal direction; a first carriage arranged on the rail guide and configured to move along the rail guide back and forth, the first carriage comprising a first saw log support and a first carriage drive; and a second carriage arranged on the rail guide and configured to move along the rail guide back and forth, the second carriage comprising a second saw log support and a second carriage drive; wherein the first saw log feeder is configured to load a first saw log onto the first saw log support, when the first carriage is moved to the first saw log feeder along the rail guide; wherein the second saw log feeder is configured to load a second saw log onto the second saw log support, when the second carriage is moved to the second saw log feeder along the rail guide; wherein the first carriage drive is configured to move the first carriage together with the first saw log along the longitudinal direction past the saw in order to saw the first saw log along the longitudinal direction; and wherein the second carriage drive is configured to move the second carriage together with the second saw log along the longitudinal direction past the saw in order to saw the second saw log along the longitudinal direction; wherein the first and second carriage drives are configured to move the first and second carriages separately along the rail guide such that the first saw log is sawed using the saw while the second saw log is loaded onto the second saw log support and vice versa.

According to another aspect, in a sawing facility comprising a rail guide defining a longitudinal direction; a saw arranged at the rail guide; a first saw log feeder arranged on a first side of the saw along the longitudinal direction; a second saw log feeder arranged on a second side of the saw opposite from the first side along the longitudinal direction; a first carriage arranged on the rail guide and configured to move along the rail guide back and forth, the first carriage comprising a first saw log support and a first carriage drive; and a second carriage arranged on the rail guide and configured to move along the rail guide back and forth, the second carriage comprising a second saw log support and a second carriage drive; there is provided a method of sawing a plurality of saw logs, the method comprising the steps of: transferring a first saw log onto the first saw log support using the first saw log feeder; moving the first carriage together with the first saw log along the longitudinal direction past the saw, thereby sawing the first saw log along the longitudinal direction; transferring a second saw log onto the second saw log support using the second saw log feeder while the first saw log is sawed using the first carriage and the saw; and moving the second carriage together with the second saw log along the longitudinal direction past the saw, thereby sawing the second saw log along the longitudinal direction, when the sawing of the first saw log is interrupted or completed.

According to the new sawing facility and method, two carriages, each driven separately, are arranged on the rail guide for processing the saw logs. Thus, unlike a common setup, the sawing facility has one saw selectively cooperating with two separate carriages.

A significant advantage is that the above-mentioned time loss, which occurs, for example, when the carriage is fed or loaded with the saw log and/or due to the alignment of the saw log on the saw log support of the carriage, can be reduced or minimized. This makes it possible to increase the productive sawing time and thus the output of resulting sawing products. This leads to an economically optimized operation of the sawing facility.

In the present context, the term "saw" is understood to mean in particular a motorized band saw, a motorized circular saw or a motorized crosscut saw, although other types of saws are also contemplated.

In preferred exemplary embodiments, the first and the second carriage can be moved back and forth on the rail guide separately from each other. This means, for example, that the first carriage can move back and forth on the rail guide while the second carriage is stationary (at the same time) and is loaded with saw log.

By using the two carriages, it is possible, for example, for unproductive loading and/or manipulation work to be carried out on the first carriage, while (simultaneously) the second saw log already positioned (i.e., turned and aligned) on the second carriage is sawed by passing the saw.

As soon as a manipulation (for example a realignment) of the second saw log is carried out on the second carriage or the processing of the second saw log is completed, i.e., the second carriage has to be loaded again, it can return to its loading and manipulation zone. At the same time, the first carriage, now fully loaded, can follow it in the direction of the saw in order to start sawing the first saw log. It is advantageous if only a minimum dead time (during which no sawing of a material takes place) occurs between the completion of one sawing operation and the start of the other.

As soon as the first carriage has to be reloaded after completion or interruption of the sawing process, or a realignment or manipulation of the first saw log has to be carried out, it can move to its loading and manipulation position and the second carriage can move to the saw to saw the newly fed or realigned second saw log.

The first and second carriages thus enable alternate sawing of either the first or the second saw logs with low "dead times". This can increase the effective processing time of the saw logs compared to known systems.

The term "rail guide" is understood to mean any type of guide rail by means of which guided sliding or movement of a carriage can be achieved. Advantageously, the rail guide may be in the form of railway tracks.

The term "longitudinal direction" is understood to mean a direction in which the rail guide is laid along its length. The rail guide preferably runs in a straight line, starting from a starting position defined upstream of the saw to an end position defined downstream of the saw along the longitudinal direction.

The first and the second carriages advantageously each have their own carriage drive. The respective carriage drives allow the two carriages to be moved separately back and forth or upstream and downstream along the longitudinal direction.

The phrase "that the saw is arranged at the rail guide" expresses that the saw is arranged adjacent to the rail guide, i.e., preferably in the direction of a track width of the rail guide.

The phrase "passing" is understood to mean that the saw log is passed through the saw blade with a predefined projection (which is defined transversely to the longitudinal direction), so that a cut-off/sawing-off of the sawing product can take place. The thickness of the sawing product to be cut off results from the projection, taking into account a kerf width defined by the thickness of the saw blade.

In one refinement, the first saw log feeder is configured to transfer the first saw log onto the first support in a transverse direction defined transversely to the longitudinal direction. Furthermore, it is preferred that the second saw log feeder is configured to transfer the second saw log onto the second support in the transverse direction that is defined transverse to the longitudinal direction.

This refinement has the advantage that the overall length of the sawing facility in the longitudinal direction can be minimized. In addition, feeding the saw log transversely to the longitudinal direction reduces the risk of intervention/disruption in the ongoing sawing process on the respective other carriage.

The term "transverse" is not necessarily understood to mean perpendicular or orthogonal, but any feed at an angle not equal to 0 degrees (°). Preferably, however, the feed is substantially perpendicular or orthogonal (i.e., at an angle of 90° plus or minus 10 percent (%)) to the longitudinal direction.

In another refinement, the sawing facility defines a first feed area as viewed along the longitudinal direction, a working area adjoining the first feed area, and a second feed area adjoining the working area. The first saw log feeder is arranged in the first feed region, the saw is arranged substantially centrally in the working region, and the second saw log feeder is arranged in the second feed area.

In other words, at the beginning of the rail guide (upstream) is the first feed area (or the first loading and manipulation area) of the first carriage. Viewed longitudinally, in a central area of the rail guide is the working area, which, viewed longitudinally, extends on both sides of the saw. The saw is preferably arranged substantially centrally (plus or minus 10%) in the working area.

In the working area, processing of the saw log by means of the saw takes place. In addition, the sawing products are produced and discharged in the working area. At the downstream end of the rail guide, the second feed area (or the second loading and manipulation area) of the second carriage is arranged. In each of the two feed areas, the loading of the respective carriage with the saw log and preferably an alignment of the saw log on the respective saw log support takes place.

By organizing the sawing facility into the first feed area, the working area and the second feed area, trouble-free operation of the sawing facility can be ensured, since loading and manipulation of the saw logs takes place only in the feed areas, but not in the working area. This enables a highly efficient sawing process.

In a further refinement, the first and/or the second feed area are adjacent to the work area, but preferably do not overlap with the working area.

This refinement serves to clarify that loading and manipulation operations that take place in the feed areas do not have a negative effect on the processing steps (the sawing of the saw log) in the working area. Thus, time required for loading and manipulation does not have a negative effect on the sawing process. The first and/or the second feed area preferably does not overlap or only partially overlaps the working area.

In a further refinement, the first feed area is located upstream from the saw along the longitudinal direction and the second feed area is located downstream from the saw along the longitudinal direction.

This refinement clarifies the positioning of the respective areas within the sawing facility. The working area, when viewed longitudinally, extends both upstream and downstream of the saw, whereas the first feed area is located further upstream without overlapping with the working area, and the second feed area is located further downstream without overlapping with the working area.

In a further refinement, the sawing facility further comprises a first sawing product discharge and a second sawing product discharge. The first sawing product discharge and the second sawing product discharge are configured to discharge a sawing product formed by sawing the first saw log or the second saw log This refinement provides a further difference compared to the usual design of a sawing facility. In conventional sawing facilities, in which sawing products are produced both in the forward and in the backward movement of the carriage, sawing products accumulate both upstream and downstream from the band saw and are discharged as follows to the present state of the art:

The saw products accumulating downstream from the band saw are discharged on a conveyor (e.g. roller conveyor or conveyor belt) in the longitudinal direction. The upstream saw products are transported by means of a further conveyor, which is arranged between the saw blade and a column structure of the band saw (the band saw column), through the band saw column onto the conveyor system located downstream in the longitudinal direction and discharged from the latter in the longitudinal direction.

After the sawing product resulting upstream has passed the band saw column, it is thus discharged by the same conveyor system that is used for saw products that result downstream. Particularly in the case of a fast cutting sequence, it is possible that the downstream transport system is still occupied by a sawing product that has accumulated upstream (before the band saw column), since this sawing product has to travel a longer distance (through the band saw column). To avoid this, the conveying systems upstream and downstream of the saw are operated in the prior art with very high feed rates, which results in fast discharge of the saw products. This makes it difficult to reliably control the discharge of saw products from the sawing facility to further processing.

In particular, it is advantageous that no sawing product accumulated upstream has to be transported through the band saw column in this refinement, since this sawing product can be discharged by means of the first saw log discharge. Thus, in contrast to the prior art, the downstream discharge is no longer used here, whereby both the first and the second saw log discharges can be designed with lower feed rates, which has a positive effect on the aforementioned control.

In a further refinement, the first sawing product discharge is configured to discharge the sawing product transversely to the longitudinal direction. It is further preferred that the second sawing product discharge is configured to discharge the sawing product transversely to the longitudinal direction.

This refinement makes it advantageously possible to avoid the problematic discharge situation. The saw products are discharged both upstream and downstream, in each case transversely to the longitudinal direction. This means that the upstream and downstream removal of the sawing products do not interfere with each other.

In a further refinement, the first sawing product discharge is arranged upstream of the saw along the longitudinal direction, and the second sawing product discharge is arranged downstream of the saw.

It is preferred that both the first sawing product discharge and the second sawing product discharge are located in the working area of the sawing facility, thus avoiding interaction with the first and second saw log feeder areas, respectively.

In a further refinement, the saw comprises a band saw blade that defines a sawing direction during sawing that is oriented transverse to the longitudinal direction.

The sawing direction refers to the direction of rotation of the band saw blade around two preferably existing band saw rolls between which the band saw blade is clamped and around which the band saw blade is moved during sawing. The sawing direction is preferably parallel to an imaginary connecting line between the two centers of the band saw rolls.

In another refinement, the bandsaw blade has saw teeth on both sides when viewed in the longitudinal direction.

This saw toothing on both sides efficiently ensures that sawing of the saw log can take place both when the first or second carriage moves from upstream to downstream and from downstream to upstream.

In a further refinement, a first basement discard chute is arranged upstream of the saw as viewed along the longitudinal direction. Furthermore, it is preferred that a second basement discard chute is arranged downstream of the saw.

In particular, when a basement discard chute is arranged on both sides, it is advantageous for the sawing process by means of the sawing facility.

In conventional sawing facilities, the first processing step involves a downstream movement of the carriage to create a first usable surface on the saw log. This usually results in a cut-off piece that cannot be used for further processing, the so-called slab. This slab must be discharged from the further process. Usually, the slab accumulates downstream of the saw and is discharged by lateral displacement of the conveyor system (i.e., the roller table or the conveyor belt downstream of the saw) into an opening at the bottom, the so-called basement discharge, in the direction of a residual wood disposal. The separated slab usually falls into this basement discard chute directly after it has been separated from the saw log and can thus be discarded directly from the further production process.

By means of two basement discard chutes (advantageously upstream and downstream of the saw), it is possible in the new sawing facility to discard in a simple manner any upstream slab produced during a first processing step of the second saw log while the second carriage is passing the saw in an upstream direction. Thus, an unproductive empty run of the second carriage (without processing) can be avoided, since the separation of the slab already takes place during the upstream movement. In contrast to the prior art, the slab separated in this way can also be discarded through the first basement discard chute.

In a further refinement, the first basement discard chute is configured to receive a slab that is produced during sawing of the first and/or second saw log. In a further advantageous refinement, the second basement discard chute is configured to receive a slab that is produced during sawing of the first and/or second saw log.

In a further refinement, a conveyor is further arranged on the saw and is configured to tilt about an axis of rotation parallel to the longitudinal axis.

The conveyor is preferably arranged in an area between the saw blade and the saw column. Furthermore, it is preferred that the first sawing product discharge is arranged upstream of the conveyor in direct connection thereto. Furthermore, it is preferred that the second sawing product discharge is arranged downstream in direct connection to the conveyor. This arrangement makes it possible to ensure smooth removal of the accumulating sawing products both upstream and downstream of the saw.

In order to discard the slab accumulating upstream during the first processing of the second saw log as smoothly as possible, the conveyor can be tilted about the axis of rotation (in particular, it can be folded upward), unlike in the prior art, so that when the slab is discarded upstream, only a part of the first sawing product discharge (a conveyor equipped for this purpose) is moved transversely to the longitudinal direction in order to open the first basement discard chute.

In a further refinement, the first and second carriages are configured to selectively be coupled to each other for simultaneous travel on the rail guide when coupled.

The coupling can be implemented purely mechanically (for example via catch hooks) and/or (electro-)magnetically and/or also virtually (by a controlled coupling of the first and second carriage drives). In the coupled state of the first and second carriage, the first and/or the second saw log feeder can preferably be set up to transfer an overlong saw log onto the two coupled carriages.

The advantageous coupling of the first and second carriages makes it possible to use two smaller-dimensioned, lighter and thus more dynamic carriages in terms of their mobility, each of which advantageously has its own drive, so that it is also possible to process large-dimensioned saw logs (for example, long saw logs or long tree trunks). Due to the relatively low weight of the first and second carriage, it is possible to achieve high acceleration values in each case, which are difficult to achieve with a longer and therefore heavier carriage normally required for processing long saw logs. By coupling the two carriages, it is possible to unite the two saw log supports with each other and thereby also to increase the number of preferably available clamping blocks that are used to fix the saw log onto the saw log support, in particular for processing of larger dimensioned saw logs. Thus, even when processing longer saw log, a high dynamic of the respective carriage can be ensured.

In a further refinement of the method, the first and second carriages are moved substantially in alternating sequence along the longitudinal direction to saw the first and/or the second saw log.

This refinement again clarifies that the processing of the first and second saw log preferably takes place in alternating sequence, i.e., while, for example, the first carriage is loaded with the first saw log or the first saw log is positioned on the saw log support, the processing of the second saw log takes place by moving the second carriage back and forth. If the processing of the second saw log is completed or if the sawing process has to be interrupted due to a repositioning of the second saw log on the saw log support and if the loading of the first carriage as well as the positioning of the first saw log on the first saw log support is completed, the processing of the first saw log can take place as directly as possible after the completion of the processing of the second saw log.

It is understood that the above-mentioned features and features still to be explained below can be combined not only in the respectively indicated combination, but also freely with each other without leaving the scope of the present disclosure. Furthermore, it is understood that with respect to the sawing facility, the refinements mentioned also refer in equivalent form to the process according to the disclosure and its refinements, without being mentioned separately. The same applies to refinements of the process with respect to the sawing facility.

BRIEF DESCRIPTION OF THE DRAWINGS

Exemplary embodiments of the disclosure are shown in the drawings and are explained in more detail in the following description. Showing.

DETAILED DESCRIPTION

Figure 1:
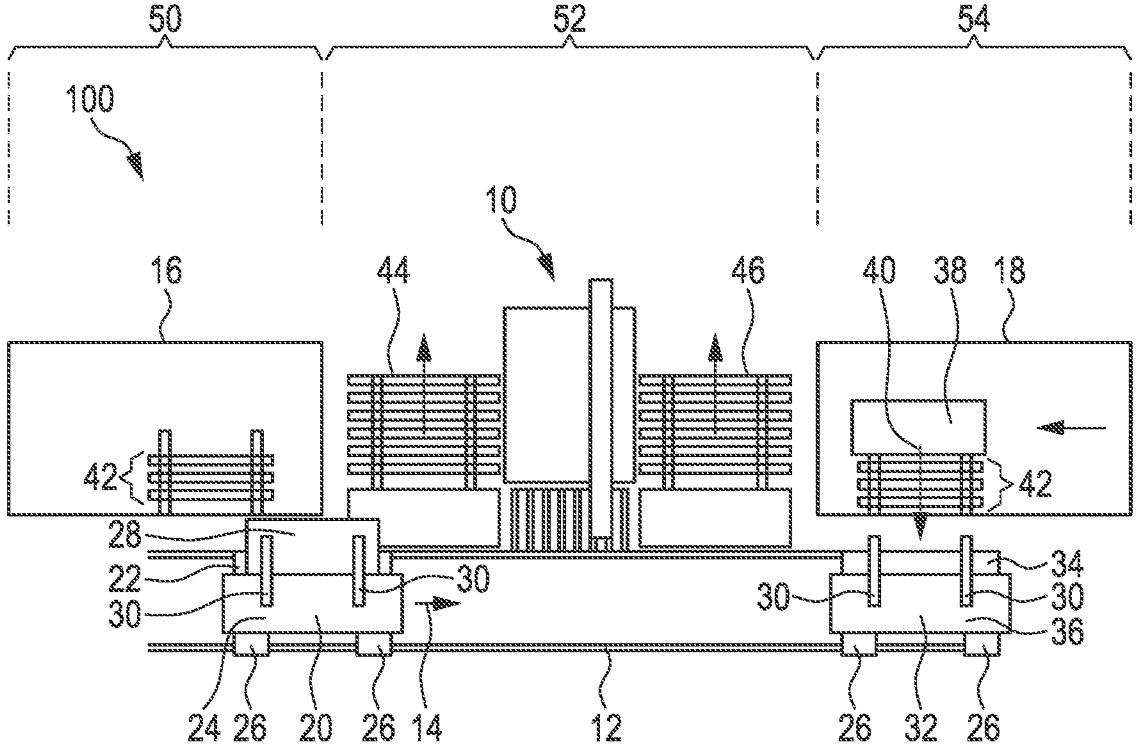
FIG. 1 is a schematic front view of an example sawing facility according to the principles of the present disclosure, with the sawing facility shown in a first processing position.

FIG. 1 shows a first exemplary embodiment of a sawing facility according to the disclosure. The sawing facility is designated by reference numeral 100 in its entirety. In the present case, the sawing facility 100 is a band saw mill and comprises a band saw 10. In addition, the band saw mill 100 has a rail guide 12 by which a longitudinal direction 14 is defined. Viewed along the longitudinal direction 14, the band saw 10 is arranged in a central area of the rail guide 12 laterally adjacent to the rail guide, i.e., outside thereof. In other exemplary embodiments not shown, the sawing facility 100 may, for example, be a circular sawing facility.

The band sawing facility 100 further comprises a first saw log feeder 16 arranged upstream (in FIG. 1 on the left) of the band saw 10 laterally adjacent to and outside the rail guide 12. Furthermore, the band sawing facility 100 comprises a second saw log feeder 18 arranged downstream (in FIG. 1 on the right) of the band saw 10 laterally next to and outside the rail guide 12.

Further, the band sawing facility 100 comprises a first carriage 20. The first carriage 20 includes a first saw log support 22 and a first carriage drive 24. The first carriage drive 24 is integrated into the first carriage 20, for example, and may be configured as any type of motorized drive. In other advantageous exemplary embodiments, the first carriage drive 24 is arranged below the rail guide 12 or at an upstream or downstream end of the rail guide 12 and moves the first carriage via a cable pull. The first carriage 20 preferably has a number (e.g., two) of wheel axles (not shown) spaced apart from each other and aligned perpendicular to the rail guide 12, each having two pairs of running wheels 26, corresponding to the number of tensioning jacks on the carriage. By means of the pairs of running wheels 26, the first carriage 20 is guided on the rail guide 12.

The first saw log support 22 is configured to receive a first saw log 28. The first saw log 28 is, for example, a saw log in the form of a tree trunk. In FIG. 1, the first saw log 28 already lies on the first saw log support 22 and is fixed on the first saw log support 22 with the aid of two advantageous clamping blocks 30.

In order to change the position of the first saw log 28 on the first saw log support 22, for example to rotate it about the longitudinal direction 14 or to tilt it, it is preferred that the first carriage 20 comprises a turning and rotating mechanism, for example in the form of a saw log turner, which enables rapid rotation in both directions of rotation about the longitudinal direction 14.

The band sawing facility 100 further comprises a second carriage 32, which comprises a second saw log support 34 and a second carriage drive 36. The second saw log support 34 is configured to receive a second saw log 38 and to fix the latter, preferably via the clamping blocks 30, in a predetermined position on the second saw log support. The remaining features described with respect to the first carriage 20 apply in an analogous manner to the second carriage 32, without redundant explanation.

In FIG. 1, the second saw log feeder 18 is configured to transfer the second saw log 38 to the second saw log support 34. In the case of FIG. 1, the second saw log 38 is still arranged on the second saw log feeder 18, i.e., it has not yet been transferred to the second saw log support 34.

Both the first and the second saw log feeder 16, 18 preferably have one or a plurality of conveying techniques (for example roller conveyors, conveyor belts or cross-chain conveyors) by means of which the respective saw log 28, 38 can be transported both in the longitudinal direction 14 and in a transverse direction 40 extending transversely to the longitudinal direction 14 and can thus be fed to the respective saw log support 22, 34. In FIG. 1, a cross-chain conveyor 42 is indicated by way of example, by means of which the respective saw log 28, 38 can be conveyed in the transverse direction 40.

Furthermore, the band sawing facility 100 according to FIG. 1 comprises a first sawing product discharge 44, which is arranged upstream (in FIG. 1 on the left) of the band saw 10 when viewed from the band saw 10. Furthermore, the band sawing facility 100 comprises a second sawing product discharge 46, which is arranged downstream (in FIG. 1 on the right) of the band saw 10 when viewed from the band saw 10.

Figure 2:
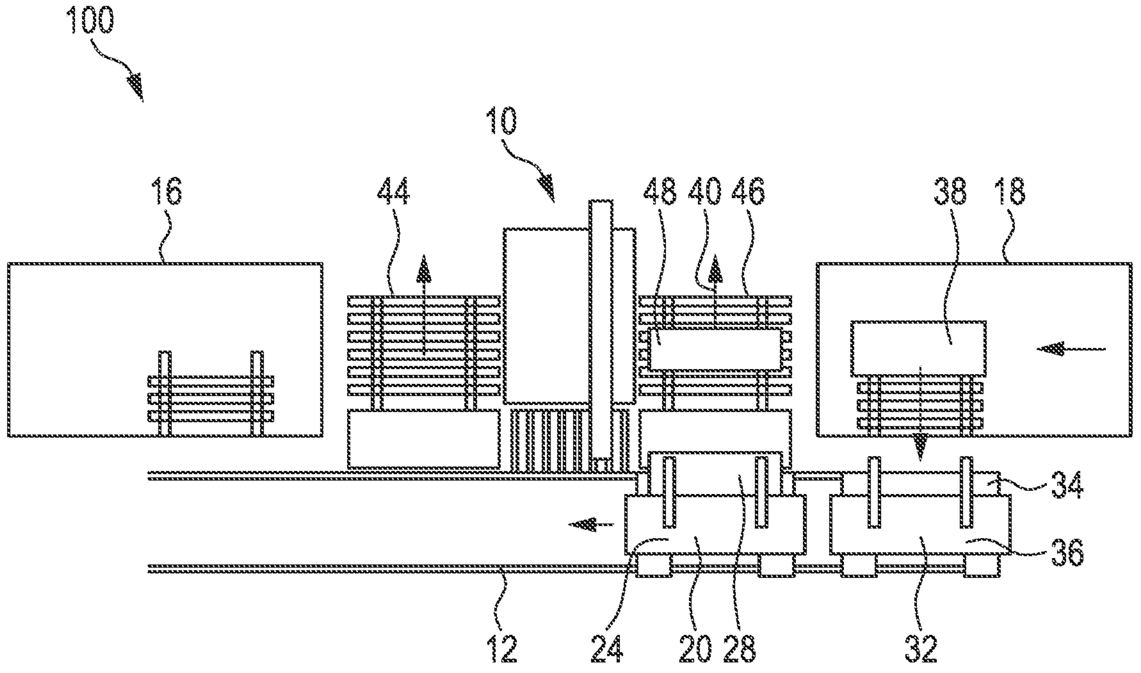
FIG. 2 is a schematic front view of the sawing facility of FIG. 1 shown in a second processing position.

Both the first sawing product discharge 44 and the second sawing product discharge 46 are configured to discharge a sawing product 48 along the transverse direction 40, the sawing product 48 being formed by sawing the first and/or the second saw log 28, 38. However, the sawing product 48 is discharged along the transverse direction 40 in the opposite direction to the feed direction, i.e., away from the rail guide 12. An exemplary discharge of the sawing product 48 by the second sawing product discharge 46 is shown in FIG. 2. The produced sawing product 48 may, for example, be a board sawed off from the first and/or second cut material.

When viewed in the longitudinal direction 14, the band saw 100 can be divided into three distinct areas. Upstream of the band saw 10 (at the left outer edge of FIG. 1), a first feed area 50 is arranged in which the first saw log feeder 16 is arranged. The first feed area 50 extends in the downstream direction along the longitudinal direction 14 as far as the dimensioning of the first saw log feeder 16 requires.

Adjacent to the first feed area 50, but preferably not overlapping, is a working area 52. The working area 52 preferably extends both upstream and downstream of the band saw 10, with the band saw 10 being arranged substantially centrally in the working area 52. To the left and right (upstream and downstream) of the band saw 10 are arranged the first and second sawing product dischargers 44, 46 also within the working area 52. A second feed area 54, in which the second saw log feeder 18 is arranged, adjoins the downstream end of the working area 52 as shown on the right of FIG. 1.

In the case shown in FIG. 2, the band sawing facility 100 is shown in a second processing position in which the first carriage 20 has already passed the band saw 10 along the longitudinal direction 14 by means of the first carriage drive 24 with the first saw log 28 on the rail guide 12 and during this passing the first saw log 28 has already been sawed along the longitudinal direction 14. During this sawing, the sawing product 48 has been separated from the first saw log 28 and can thus be discharged via the second sawing product discharge 46 in the transverse direction 40. In the position of the first carriage 20 shown in FIG. 2, the first carriage 20 is about to be moved again in the upstream direction by the first carriage drive 24 in order to saw the first saw log 28 again along the longitudinal direction 14 when the first saw log 28 passes the band saw 10 again.

Figure 3:
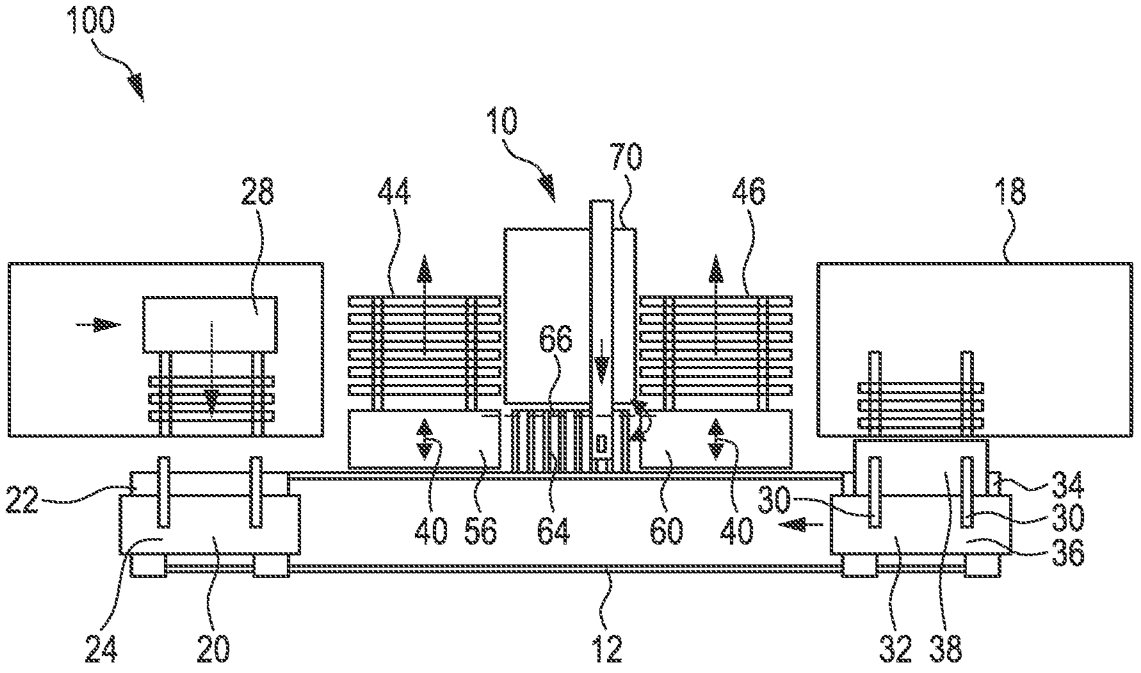
FIG. 3 is a schematic front view of the sawing facility of FIG. 1 shown in a third processing position.

In FIG. 3, the band sawing facility 100 is shown in a third processing position in which the second carriage 32 has already been loaded with the second saw log 38 via the second saw log feeder 18 and the second saw log 38 thus rests on the second saw log support 34 and is preferably fixed thereon via the two clamping blocks 30.

During the initial processing step of the first and second saw logs 28, 38, it is usually customary to cut off a slab (a piece of wood that cannot be used economically). Depending on whether the first or the second saw log 28, 38 is initially sawn, the slab accumulates either upstream or downstream of the band saw 10 and is discharged from the further processing process at these respective points.

Figure 4:
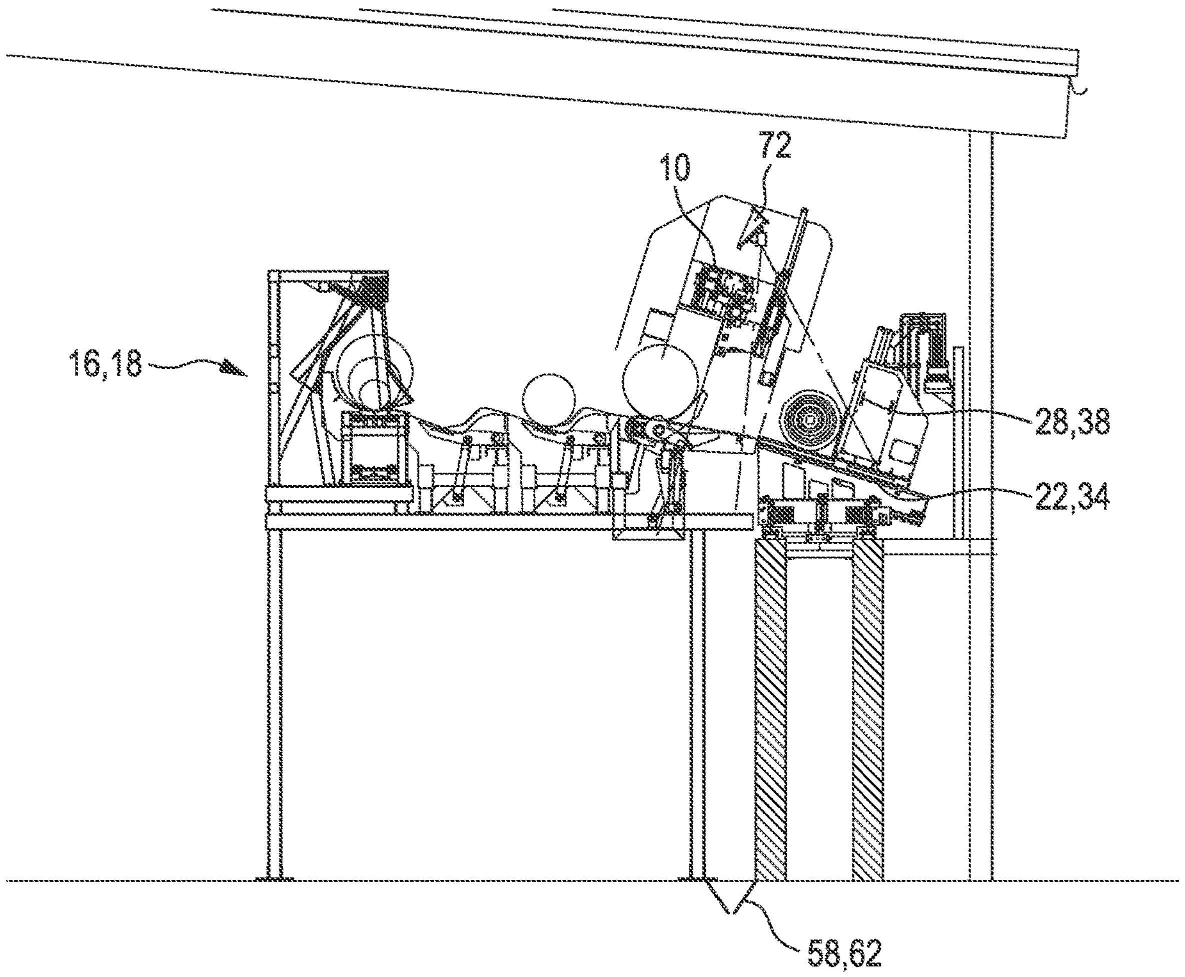
FIG. 4 is a schematic side view of an example saw log feed according to the principles of the present disclosure.

For discharging the sawing products, a first conveyor 56 belonging to the first sawing product discharge 44 is preferably configured to be moved in the transverse direction 40 in such a way that the resulting slab can fall into a basement opening (in the case of FIG. 3 into the sheet plane) in order to be discharged, the basement opening being called here a first basement discard chute 58 (see FIG. 4). Furthermore, downstream of the band saw 10, a second conveyor 60 belonging to the second sawing product discharge 46 is configured to be moved also in the transverse direction 40 in order to allow a slab resulting downstream to fall into an opening arranged below the second conveyor 60, the opening being referred to herein as a second basement discard chute 62 (see FIG. 4).

To ensure discharge of the slab into the first or second basement discard chutes 58, 62, respectively, upstream and downstream, a conveyor 64 is tiltable (upwardly, i.e., out of the sheet plane) about an axis of rotation 66 parallel to the longitudinal axis 14. The conveyor 64 is, for example, a roller conveyor or another conveyor arranged between the first and second sawing product dischargers 44, 46, more specifically between the first and second conveyors 56, 60, when viewed along the longitudinal direction 14. Viewed in the transverse direction 40, the conveyor 64 is arranged between a band saw blade 68 (see FIG. 5) and a band saw column 70. In FIG. 3, the conveyor 64 is a roller conveyor.

FIG. 4 shows a schematic view of the first or second saw log feeder 16, 18. As can be seen, the first or second saw log 28, 38 is conveyed by means of the saw log feeder 16, 18 stepwise onto the first or second saw log support 22, 34. In the case shown in FIG. 4, a saw log 28, 38 is already on the saw log support 22, 34. In addition, it is schematically shown in FIG. 4 that by means of the saw log feeder 16, 18, saw logs having various width dimensions can be conveyed through the saw log feeder 16, 18 onto this saw log support 22, 34.

In FIG. 4, it is further shown that the feed of the saw log 28, 38 is preferably monitored and/or controlled by measurement technology, wherein in FIG. 4 an optical sensor system 72 is arranged above the saw log support 22, 34. The optical sensor system 72 can preferably be in the form of a camera which communicates with a controller (not shown) in such a way that the feed of the saw log 28, 38 can be controlled via the images captured by the camera 72. In addition, FIG. 4 schematically shows the first and second basement discard chutes 58, 62, respectively.

Figure 5:
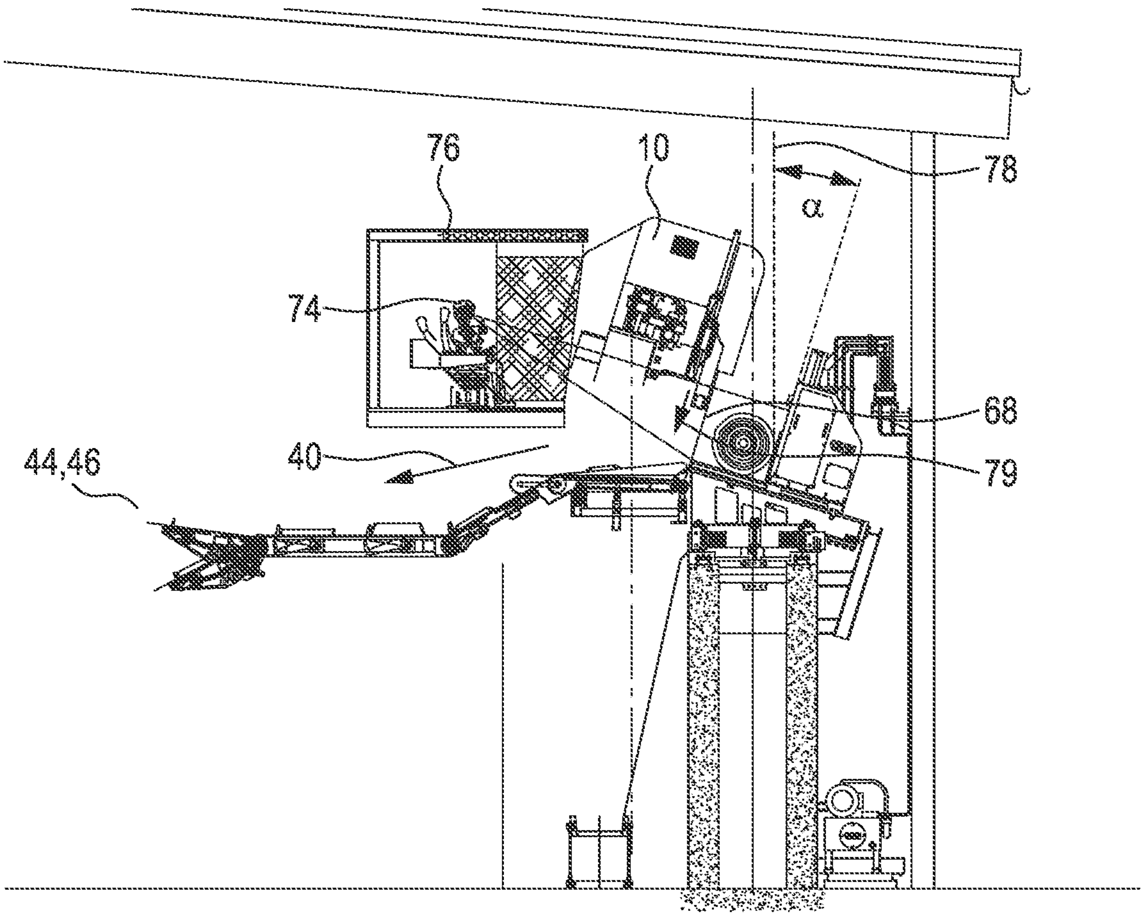
FIG. 5 is a schematic side view of an example saw log discharge according to the principles of the present disclosure.

FIG. 5 shows a schematic view of the first and second sawing product discharge 44, 46, respectively. Both the sawing process and the saw log feeder and discharge are preferably monitored (audio-)visually by an operator 74 sitting in a driver's cab 76 in order to detect disturbance and faults in the band sawing facility 100 as early as possible. In FIG. 5, it can be seen that preferably both the band saw 10 or the band saw blade 68 and the first and second saw log supports 22, 34 are each tilted by an angle $\alpha$ of 17° with respect to a vertical direction 78, by way of example, since such an angle has proven to be particularly advantageous. The band saw blade 68 is further clamped between two spaced band saw rollers (not shown) and rotates about them, thereby defining a sawing direction 79.

Figure 6:
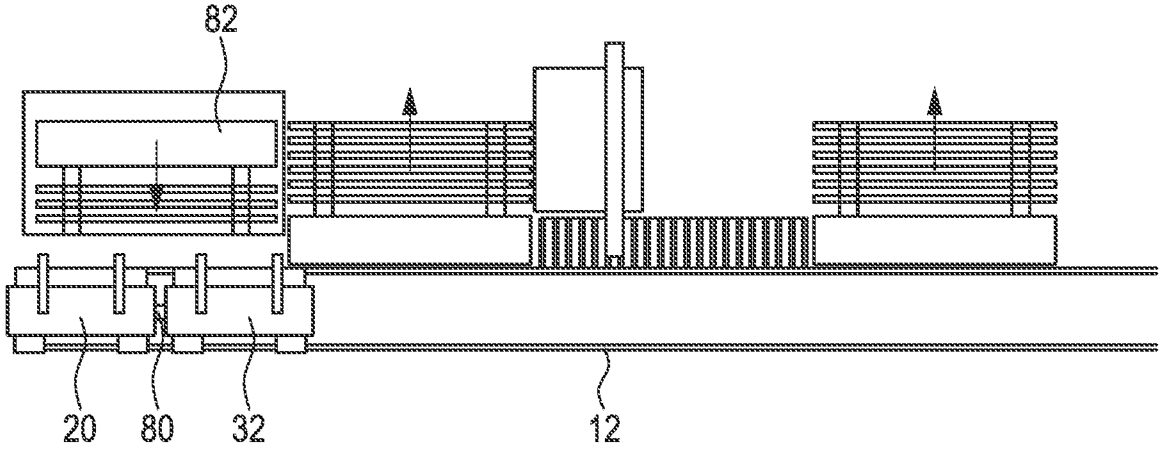
FIG. 6 is a schematic front view of a second example of a sawing facility according to the principles of the present disclosure.

FIG. 6 shows a second exemplary embodiment of the band sawing facility 100. In this exemplary embodiment, the first and second carriages 20, 32 are coupled to each other via a coupling 80 in such a way that the first and second saw log supports 22, 34 can preferably be used synergistically for supporting an overlong saw log 82 without having to use a carriage with larger dimensions as a substitute. The coupling 80 between the first and second carriages 20, 32 is preferably mechanical (via catch hooks), (electro-)magnetic or virtual.

By way of example, in the case of virtual coupling, it is possible for the first and second carriage drives 24, 36 to be coordinated with each other in such a way that the first and second carriages 20, 32 move directly behind each other at a predefined distance, whereby the master-slave principle, for example, is suitable for this type of control. Here, for example, the second carriage 32 as master can control the movement of the first carriage 20 via a coupling of the two drive controls.

In the case shown in FIG. 6, both the saw log feeder and the sawing product discharge are designed with increased dimensions according to the dimensions of the extra-long saw log 82.

What is claimed is:

1. A sawing facility comprising:

a rail guide having a first end and a second end, the rail guide defining a longitudinal direction from the first end to the second end;

a saw arranged at a central area of the rail guide between the first end and the second end;

a first saw log feeder arranged on a first side of the saw along the longitudinal direction;

a second saw log feeder arranged on a second side of the saw opposite from the first side along the longitudinal direction;

a first carriage arranged on the rail guide and configured to move along the rail guide back and forth, the first carriage comprising a first saw log support and a first carriage drive; and a second carriage arranged on the rail guide and configured to move along the rail guide back and forth, the second carriage comprising a second saw log support and a second carriage drive, wherein the first saw log feeder is configured to load a first saw log onto the first saw log support when the first carriage is moved to the first saw log feeder along the rail guide, wherein the second saw log feeder is configured to load a second saw log onto the second saw log support when the second carriage is moved to the second saw log feeder along the rail guide, wherein the first carriage drive is configured to move the first carriage together with the first saw log along the longitudinal direction past the saw in order to saw the first saw log along the longitudinal direction, wherein the second carriage drive is configured to move the second carriage together with the second saw log along the longitudinal direction past the saw in order to saw the second saw log along the longitudinal direction, and wherein the first and second carriage drives are configured to move the first and second carriages separately along the rail guide such that the first saw log is sawed using the saw while the second saw log is loaded onto the second saw log support and vice versa.

2. The sawing facility of claim 1, wherein the first saw log feeder is configured to load the first saw log onto the first saw log support in a feed direction defined transversely to the longitudinal direction.

3. The sawing facility of claim 1, wherein the first saw log feeder is arranged in a first feed area, the saw is arranged substantially centrally in a working area, and the second saw log feeder is arranged in a second feed area, and wherein the first and second feed areas adjoin the working area as viewed along the longitudinal direction.

4. The sawing facility of claim 3, wherein the first feed area and the second feed area do not overlap with the working area.

5. The sawing facility of claim 1, further comprising a first sawing product discharge configured to discharge a sawing product resulting from sawing the second saw log in a discharge direction transverse to the longitudinal direction.

6. The sawing facility of claim 5, wherein the first sawing product discharge is arranged on the first side of the saw along the longitudinal direction.

7. The sawing facility of claim 6, wherein the first sawing product discharge is arranged between the first saw log feeder and the saw.

8. The sawing facility of claim 6, further comprising a second sawing product discharge configured to discharge a sawing product resulting from sawing the first saw log.

9. The sawing facility of claim 8, wherein the second sawing product discharge is arranged on the second side of the saw along the longitudinal direction.

10. The sawing facility of claim 9, wherein the second sawing product discharge is arranged between the saw and the second saw log feeder.

11. The sawing facility of claim 8, wherein the second sawing product discharge is configured to discharge the sawing product resulting from sawing the first saw log transversely to the longitudinal direction.

12. The sawing facility of claim 5, wherein the first saw log feeder is configured to load the first saw log onto the first saw log support in a feed direction defined transversely to the longitudinal direction, and wherein the discharge direction is substantially opposite to the feed direction.

13. The sawing facility of claim 5, wherein the first sawing product discharge comprises a first basement discard chute configured to receive a slab produced during an initial sawing step of the second saw log.

14. The sawing facility of claim 1, further comprising a conveyor arranged at the saw, wherein the conveyor is configured to tilt about an axis of rotation extending parallel to the longitudinal direction.

15. The sawing facility of claim 1, wherein the saw comprises a band saw blade defining a sawing direction during sawing, and the sawing direction is oriented transversely to the longitudinal direction.

16. The sawing facility of claim 15, wherein the band saw blade has saw teeth on both sides as viewed along the longitudinal direction.

17. The sawing facility of claim 15, wherein the band saw blade is tilted by an angle with respect to a vertical direction.

18. The sawing facility of claim 1, wherein the first saw log feeder comprises a plurality of feeder steps such that the first saw log is conveyed stepwise onto the first saw log support.

19. The sawing facility of claim 1, wherein the first and second carriages are further configured to be coupled to one another for selective simultaneous travel on the rail guide when coupled.

20. A method of sawing a plurality of saw logs in a sawing facility, the sawing facility comprising a rail guide defining a longitudinal direction, a saw arranged at the rail guide, a first saw log feeder arranged on a first side of the saw along the longitudinal direction, a second saw log feeder arranged on a second side of the saw opposite from the first side along the longitudinal direction, a first carriage arranged on the rail guide and configured to move along the rail guide back and forth, and a second carriage arranged on the rail guide and configured to move along the rail guide back and forth, the first carriage comprising a first saw log support and a first carriage drive, the second carriage comprising a second saw log support and a second carriage drive, the method comprising:

transferring a first saw log from the plurality of saw logs onto the first saw log support using the first saw log feeder;

moving the first carriage together with the first saw log along the longitudinal direction past the saw, thereby sawing the first saw log along the longitudinal direction;

transferring a second saw log from the plurality of saw logs onto the second saw log support using the second saw log feeder while the first saw log is sawed using the first carriage and the saw; and moving the second carriage together with the second saw log along the longitudinal direction past the saw, thereby sawing the second saw log along the longitudinal direction, when the sawing of the first saw log is interrupted or completed.

* * * * *